March 15, 1938.  G. P. ROBERTS  2,111,330

BRAKE

Filed Oct. 16, 1936

INVENTOR.
GLYN PIERCE ROBERTS
BY
N. D. Parker Jr.
ATTORNEY.

Patented Mar. 15, 1938

2,111,330

UNITED STATES PATENT OFFICE 2,111,330

BRAKE

Glyn Pierce Roberts, Birmingham, England, assignor to Bendix Products Corporation, South Bend, Ind., a corporation of Indiana Application October 16, 1936, Serial No. 106,027
In Great Britain November 13, 1935

15 Claims. (Cl. 188—10)

This invention relates to brakes and more particularly to an improved means for limiting the braking effort which can be applied to the rear wheels of a vehicle equipped with four wheel brakes.

When a vehicle is being decelerated there is a transfer of weight from the rear to the front wheels due to the inertia of the mass of the vehicle and the fact that the center of gravity of the mass is necessarily located at some point above the road surface. The amount of such shifting is proportional to the rate of deceleration.

It is obvious that at high rates of deceleration the rear wheels will attain their maximum tractive effort and slide while a large part of the tractive effort which could be derived from a vehicle of given weight is yet unused.

Consequently it is an object of this invention to provide means whereby the braking force applied to the rear wheels may be limited in accordance with the rate of deceleration, while the application of braking force to the front wheels is unrestricted.

Another object is to provide means for locking a force transmitting member, which means is operated by a mass movable under the influence of inertia forces.

Still another object is to provide a device preventing further movement of a vehicle brake operating member when a predetermined rate of deceleration of the vehicle is obtained.

I prefer to accomplish the above objects by providing a completely equalized four wheel brake system having a single operating member extending to the rear brakes. The operating member may pass through a housing and form or carry therein a plunger, and a clutch or locking device comprising a series of rolls or balls working on a cam shaped inner surface of the housing is adapted to grip the operating member and prevent further brake operating movement thereof. The gripping action of the locking device is controlled by a mass free to move under the influence of the inertia forces set up therein upon deceleration of the vehicle, and a preloaded spring may oppose the movements of said mass so that it acts only when a predetermined deceleration is attained.

Figure 1:
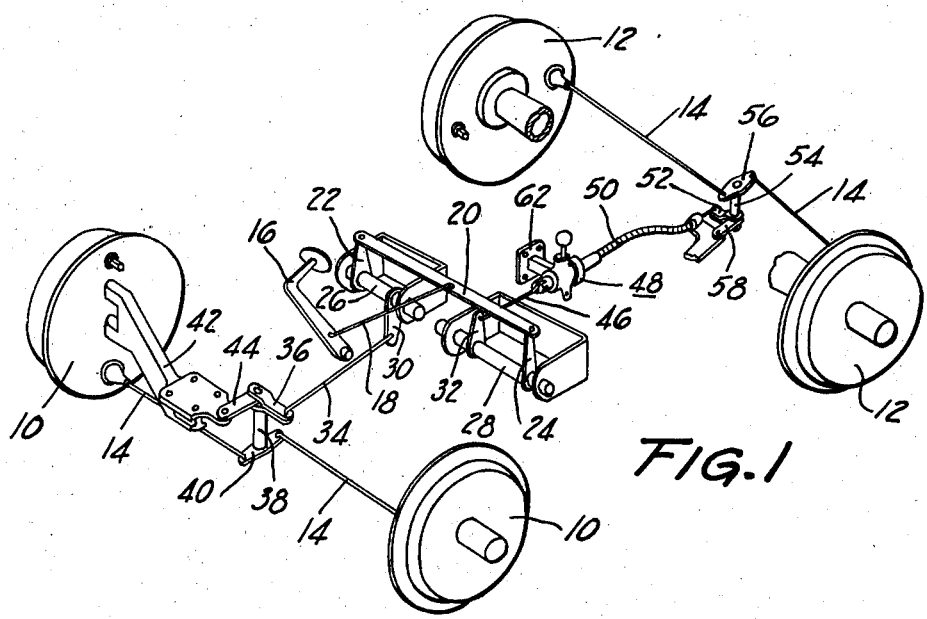
Figure 2:
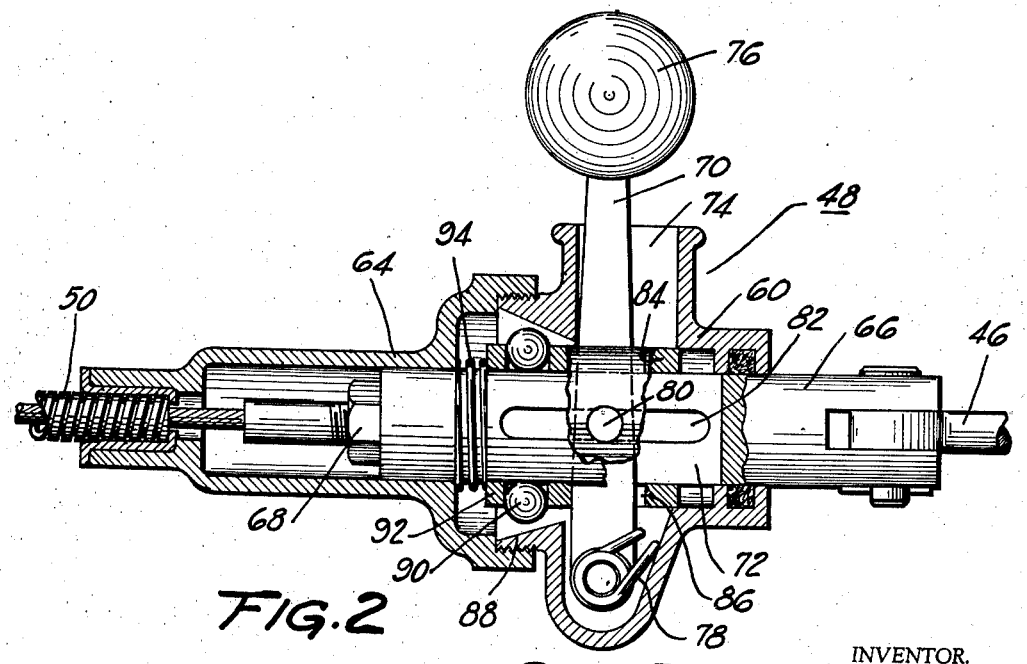

Other objects and desirable particular constructions will more fully appear in the following detailed description of one illustrative embodiment of my invention shown in the accompanying drawing, in which:

Figure 1 is a partly diagrammatic perspective view of a four wheel braking system embodying my invention; and Figure 2 is a longitudinal vertical section through the control device employed in the system of Figure 1.

Referring particularly to Figure 1 there is shown a system comprising a pair of front wheel brakes 10 and a pair of rear brakes 12 which may be mounted in the usual way on a chassis of any desired type. Tension members 14 extending from the brake chambers generally transversely of the vehicle are provided for actuating the brakes.

A driver operated pedal 16 is connected by means of a tension member 18 to the center of an equalizing bar 20 having its ends respectively operably secured to the ends of a pair of levers 22 and 24. The lever 22 is secured to a crossshaft 26 and the lever 24 is secured to a crossshaft 28. Both shafts are coaxially pivoted on the vehicle chassis and are respectively provided with a downwardly extending arm 30 and an upwardly extending arm 32.

From the arm 30 a tension member 34 extends forwardly and engages an arm 36 on a vertical shaft 38 provided with a cross-arm 40 to the opposite ends of which are respectively secured the actuating members 14 of the brakes 10. The shaft 38 is mounted on a part of the chassis such as the axle 42 by means of a link 44 which permits lateral equalizing movement.

From the arm 32 a rear brake operating member 46 extends rearwardly to my novel load control device designated generally by the numeral 48 and an extension of the member 46 in the form of a Bowden cable and conduit 50 operatively engages an arm 52 on a shaft 54 having a crossarm 56 to which the actuating members 14 of the brakes 12 are secured. A link 58 pivoted to the vehicle chassis supports the shaft 54.

Referring now to Figure 2 illustrating the novel control device 48, there is shown a housing 60 which may be secured to the chassis by any desired means such as an integral bracket 62 (see Figure 1), and which has threaded thereon a cap 64 forming, with the housing, bearings for a plunger 66 slidable therein. The operating member 46 is secured to the front end of the plunger and a fitting at the end of the Bowden cable 50 is adjustably threaded in the rear end of the plunger and locked by means such as the nut 68.

A lever 70 is pivoted in a recess in the housing 60 and passes vertically through a longitudinal slot 72 in the plunger 66. This lever extends out of the casing through an opening 74 and is provided with a weight 76. A torsion spring 78 urges the lever against a stop, in this case formed by the rear wall of the opening 74, with a predetermined force.

A pin 80 secured transversely in the lever 70 extends through a second slot 82 in the plunger 66 and is pivoted at its ends in a sleeve 84 slidably surrounding the plunger 66. The sleeve is provided with openings 86 for the passage therethrough of the lever 70.

Annularly surrounding the plunger 66 is a conical cam surface 88 formed in the housing 60. Surrounding the plunger adjacent the surface 88 but held out of contact therewith by the sleeve 84 is a series of balls or rolls 90. A washer 92 backed by a coil spring 94 urges the rolls in a direction to contact the surface 88. The spring 94 is not strong enough to overcome the opposition of the spring 78 when the parts are in the positions shown in Figure 2.

The operation of the illustrated braking system is as follows: Foot pressure, by the vehicle driver, on the pedal 16 transmits equal forces through the equalizer bar 20 to the arms 22 and 24 on the two cross-shafts rotating them and thus exerting tensile forces on the members 34 and 46.

During normal operation when a predetermined rate of deceleration is not exceeded, the plunger 66 merely slides in the housing 60 transmitting the operating forces to the Bowden cable 50.

The two shafts 38 and 54 are rotated applying the brakes through the tension members 14. Any inequality of operation of either the right or left brake is compensated by movement of the shafts 38 or 54 swinging on the respective links 44 or 58.

When a certain predetermined rate of deceleration is exceeded, the inertia forces on the weight 76 overcome the force of the spring 78 and the lever 70 swings forward and, through the pin 80, moves the sleeve 84 forward, permitting the spring 94 and washer 92 to urge the balls or rolls 90 into engagement with the surface 88 and securely lock the plunger 66 against further brake applying movement.

Additional pressure on the foot pedal 16 swings the equalizer bar 20 about the arm 24 as a fixed pivot and increases the force applied to the front brakes only. If the rate of deceleration falls to a point below the above mentioned predetermined rate, the lever 70 will be returned to its initial position by the spring 78 and the sleeve 84 will force the balls 90 out of engagement with the cam surface 88, permitting normal brake operation.

Thus it will be seen that the application of force to the rear brakes may be arbitrarily limited at some point below that at which the resulting weight transfer of the vehicle will not cause the rear wheels to slide, while at ordinary rates of deceleration (which comprises fully ninety per cent of the use of the brakes) the brakes are fully equalized. This eliminates the difficulty of uneven wear between front and rear brakes occasioned by setting the front brakes to take more of the braking effort at all times, an expedient formerly quite extensively employed.

Another desirable effect produced by my novel system is that after the rear brake operating member is locked a given increase in pedal pressure results in only one-half the increase in braking force, since only the front brakes operate. This helps prevent some of the unfortunate results of too sudden and severe brake application by inexperienced or frightened drivers.

While only one illustrative embodiment of my invention has been described in detail, many changes of form and particular arrangement might be made within the spirit and scope of my invention, and therefore it is not my intention to be limited to that embodiment or otherwise than by the terms of the appended claims.

I claim:

1. In a brake hookup for an automotive vehicle, a device comprising a force transmitting member, a member fixed to the vehicle, locking means for preventing relative movement between the force transmitting member and the fixed member, and inertia operated means for actuating said locking means.

2. In combination with a force transmitting member, a relatively fixed member, means for preventing relative movement between the force transmitting member and the fixed member, and inertia operated means for actuating the first named means.

3. In a brake hookup for an automotive vehicle having front and rear brakes, an equalizing device between the front and rear brake connections, a fixed member adjacent the rear brake connection, means for preventing relative movement between said rear brake connection and the fixed member, and inertia operated means for actuating the first named means.

4. In a brake hookup for an automotive vehicle, a device comprising a force transmitting member, a member fixed to the vehicle, locking means for preventing relative movement between the force transmitting member and the fixed member, inertia operated means for actuating said locking means, and means preventing the operation of the inertia operated means until the forces of inertia exceed a predetermined limit.

5. In combination with a force transmitting member, a relatively fixed member, means for preventing relative movement between the force transmitting member and the fixed member, inertia operated means for actuating the first named means, and means preventing the operation of the inertia operated means until the forces of inertia exceed a predetermined limit.

6. In a brake hookup for an automotive vehicle having front and rear brakes, an equalizing device between the front and rear brake connections, a fixed member adjacent the rear brake connection, means for preventing relative movement between said rear brake connection and the fixed member, inertia operated means for actuating the first named means, and means preventing the operation of the inertia operated means until the forces of inertia exceed a predetermined limit.

7. In a brake hookup for an automotive vehicle, a device comprising a force transmitting member, a member fixed to the vehicle, locking means for preventing relative movement between the force transmitting member and the fixed member, inertia operated means for actuating said locking means, and a preloaded spring acting in opposition to said inertia operated means.

8. In combination with a force transmitting member, a relatively fixed member, means for preventing relative movement between the force transmitting member and the fixed member, inertia operated means for actuating the first named means, and a preloaded spring acting in opposition to said inertia operated means.

9. In a brake hookup for an automotive vehicle having front and rear brakes, an equalizing device between the front and rear brake connections, a fixed member adjacent the rear brake connection, means for preventing relative movement between said rear brake connection and the fixed member, inertia operated means for actuating the first named means, and a preloaded spring acting in opposition to said inertia operated means.

10. In a brake hookup for an automotive vehicle, a device comprising a force transmitting member, a member fixed to the vehicle, locking means for preventing relative movement between the force transmitting member and the fixed member, inertia operated means for actuating said locking means, and resilient means opposing said inertia operated means.

11. A device for limiting the tension in a vehicle brake operating member comprising a housing rigidly secured to the vehicle and provided with a bore, a plunger forming a part of said operating member slidable in said bore, means engageable with the housing and the plunger for preventing relative movement therebetween, and a mass free to move under the influence of inertia forces operable to engage said means when the vehicle reaches a predetermined rate of deceleration.

12. In an automotive vehicle employing a plurality of braking devices, means for preventing further operation of some of said devices, means permitting the remainder of said devices to operate when the others are prevented therefrom, and means controlled by the rate of deceleration of the vehicle for operating the first named means when a predetermined rate of deceleration is attained.

13. In a four wheel braking system for vehicles, means for applying all four brakes equally, means for locking the force transmission members to the rear brakes, and means controlled by the rate of deceleration of the vehicle for operating the second named means.

14. In an automotive vehicle having brakes, a device for preventing relative movement between a fixed housing and a brake operating member slidable within the housing comprising a cam surface formed in the housing, a plurality of rolls engageable with said surface and the surface of said member, a sleeve surrounding the brake operating member adapted to move relatively to the housing for bringing the rolls into and out of engagement with said surfaces, and a mass movable under the influence of inertia forces for operating the sleeve.

15. In an automotive vehicle having brakes, a device for preventing relative movement between a fixed housing and a brake operating member slidable within the housing comprising a cam surface formed in the housing, a plurality of rolls engageable with said surface and the surface of said member, a sleeve surrounding the brake operating member adapted to move relatively to the housing for bringing the rolls into and out of engagement with said surfaces, a mass movable under the influence of inertia forces for operating the sleeve, and a preloaded resilient element opposing movement of the mass.

GLYN PIERCE ROBERTS.